United States Patent
Cai et al.

(10) Patent No.: US 11,618,719 B1
(45) Date of Patent: Apr. 4, 2023

(54) CARBON FIBER REINFORCED CARBON FOAMS

(71) Applicant: United States of America as Represented by the Secretary of Agriculture, Washington, DC (US)

(72) Inventors: Zhiyong Cai, Madison, WI (US); Qiangu Yan, Madison, WI (US)

( * ) Notice: Subject to any disclaimer, the term of this patent is extended or adjusted under 35 U.S.C. 154(b) by 197 days.

(21) Appl. No.: 17/130,450

(22) Filed: Dec. 22, 2020

(51) Int. Cl.
C04B 35/83 (2006.01)
C04B 38/00 (2006.01)

(52) U.S. Cl.
CPC .......... *C04B 35/83* (2013.01); *C04B 38/0022* (2013.01); *C04B 2235/5248* (2013.01); *C04B 2235/614* (2013.01)

(58) Field of Classification Search
CPC ..................................................... C04B 35/83
See application file for complete search history.

(56) References Cited

U.S. PATENT DOCUMENTS

| | | | |
|---|---|---|---|
| 3,894,878 A | 7/1975 | Mansmann et al. | |
| 4,430,451 A | 2/1984 | Young et al. | |
| 5,997,784 A | 12/1999 | Karnoski | |
| 6,323,160 B1 | 11/2001 | Murdie et al. | |
| 6,632,762 B1 | 10/2003 | ZaykOski | |
| 8,105,512 B1 | 1/2012 | Lucas et al. | |
| 9,493,643 B2 | 11/2016 | Li | |
| 2007/0186396 A1* | 8/2007 | Linck | D04H 1/498 28/112 |
| 2018/0079871 A1 | 3/2018 | Tudman | |

FOREIGN PATENT DOCUMENTS

| | | | |
|---|---|---|---|
| CN | 102330070 A | * | 1/2012 |
| WO | WO 2005/016818 A1 | | 2/2005 |
| WO | WO 2015/173724 A1 | | 11/2015 |
| WO | WO 2018/035598 A1 | | 3/2018 |
| WO | WO 2019/160541 A1 | | 8/2019 |
| WO | WO 2020/219021 A1 | | 10/2020 |

OTHER PUBLICATIONS

CN 102330070, machine translation (Year: 2012).*

* cited by examiner

*Primary Examiner* — Robert A Vetere (57) ABSTRACT

Methods of forming a carbon fiber reinforced carbon foam are provided. Such a method may comprise heating a porous body composed of a solid material comprising covalently bound carbon atoms and heteroatoms and having a surface defining pores distributed throughout the solid material, in the presence of an added source of gaseous hydrocarbons. The heating generates free radicals in the porous body from the heteroatoms and induces reactions between the free radicals and the gaseous hydrocarbons to form covalently bound carbon nanofibers extending from the surface of the solid material and a network of entangled carbon microfibers within the pores the porous body, thereby forming a carbon fiber reinforced carbon foam. Carbon fiber reinforced carbon foams and ballistic barriers incorporating the foams are also provided.

18 Claims, 10 Drawing Sheets

CARBON FIBER REINFORCED CARBON FOAMS

CROSS-REFERENCE TO RELATED APPLICATIONS

The present application claims the priority benefit of U.S. Provisional Patent App. No. 62/957,417 filed on Jan. 6, 2020, the entire disclosure of which is incorporated by reference herein.

BACKGROUND

Carbon foams are generally produced using elevated temperature and vacuum or inert atmosphere. The carbonization process results in significant microcracks and defects in the foam products. To strengthen the materials, a process may be performed on the carbon foam involving chemical vapor deposition (CVD). Although this post CVD process can densify the treated carbon foams, it cannot eliminate microcracks/defects.

SUMMARY

Provided are methods of forming carbon fiber reinforced carbon foams. Also provided are the carbon fiber reinforced carbon foams themselves and articles of manufacture incorporating the foams.

In embodiments, a method of forming a carbon fiber reinforced carbon foam comprises heating a porous body composed of a solid material comprising covalently bound carbon atoms and heteroatoms and having a surface defining pores distributed throughout the solid material, in the presence of an added source of gaseous hydrocarbons. The heating generates free radicals in the porous body from the heteroatoms and induces reactions between the free radicals and the gaseous hydrocarbons to form covalently bound carbon nanofibers extending from the surface of the solid material and a network of entangled carbon microfibers within the pores the porous body, thereby forming a carbon fiber reinforced carbon foam.

In embodiments, a carbon fiber reinforced carbon foam is composed of a solid covalently bound carbon matrix defining pores distributed throughout the matrix, carbon nanofibers covalently bound to a surface of the matrix and extending therefrom, and a network of entangled carbon microfibers within the pores.

Ballistic barriers comprising the carbon fiber reinforced carbon foam are also provided. In embodiments, a method of using such a ballistic barrier comprises positioning the ballistic barrier between an object and a source of firing ammunition.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are methods of forming carbon fiber reinforced carbon foams. Also provided are the carbon fiber reinforced carbon foams themselves and articles of manufacture incorporating the foams.

In one aspect, methods of forming carbon fiber reinforced carbon foams are provided. The methods comprise heating certain porous bodies in the presence of an added source of gaseous hydrocarbons. The porous body is composed of a solid material having pores distributed throughout. The solid material comprises covalently bound carbon atoms and heteroatoms. The heating step is carried out so as to generate free radicals in the porous body from the heteroatoms therein and then to react those free radicals with the gaseous hydrocarbons. These free radical reactions form a plurality of covalently bound carbon nanofibers extending from a surface of the solid material and a network of carbon microfibers within the pores of the porous body.

Figures 1A, 1B:
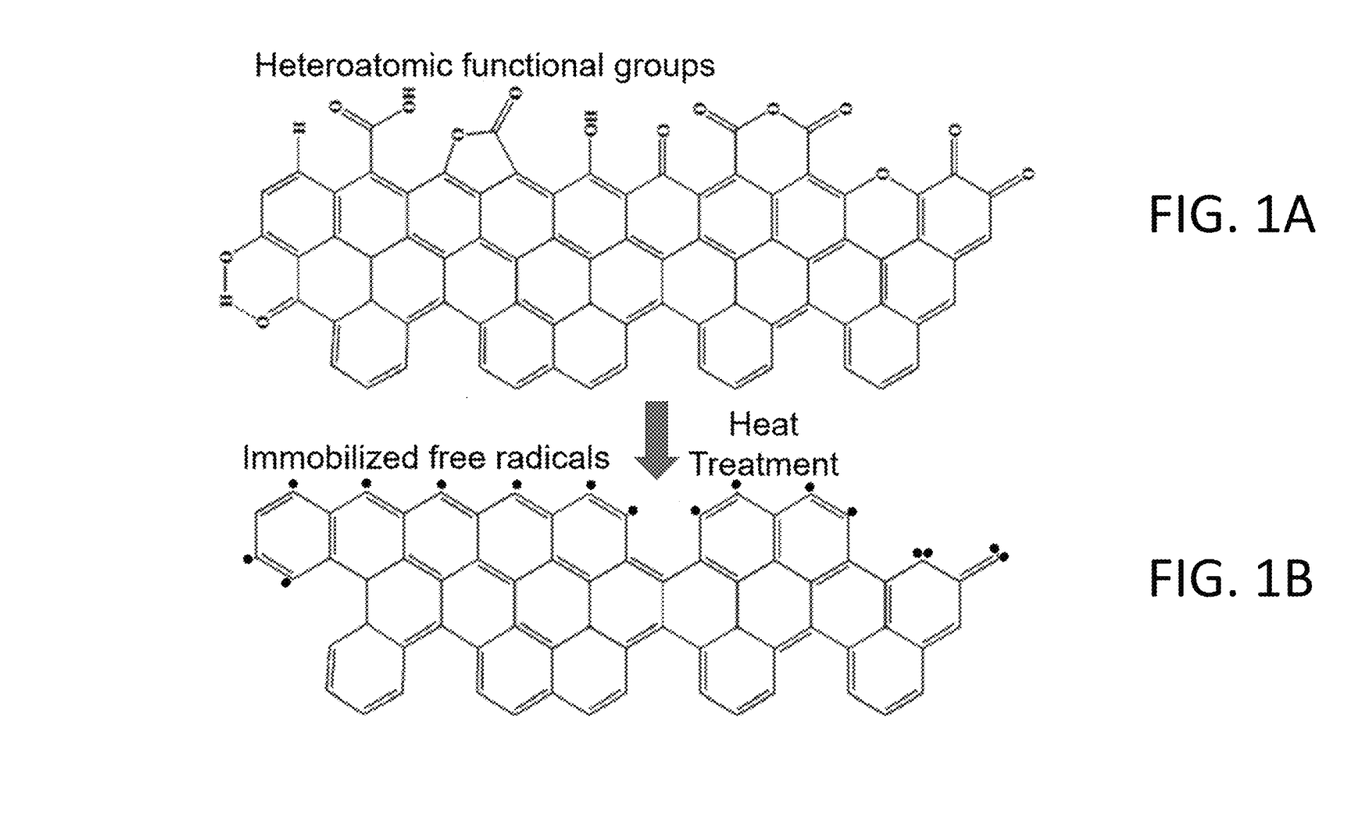
FIG. 1A depicts a portion of the carbon-heteroatom matrix of a porous body to be converted to the carbon fiber reinforced carbon foams according to embodiments of the present methods.
FIG. 1B depicts elimination of the heteroatom-containing functional groups in the matrix to generate free radicals.

The solid material of the porous body comprises both carbon atoms and heteroatoms which are covalently bound to one another to form a continuous matrix, the surface of which defines a plurality of pores. This continuous matrix, i.e., the solid material between neighboring pores may be referred to as the "walls" of the porous body. The carbon-heteroatom matrix is illustrated in FIG. 1A. As shown in this figure, carbon atoms are covalently bound to one another in the usual fused hexagonal ring structure. The solid material also includes various functional groups (e.g., hydroxyl, carboxyl, carbonyl, epoxy, anhydride, etc.), which provide the covalently bound heteroatoms (e.g., O). The chemical constitution of the porous body distinguishes it from other porous materials, e.g., carbon foams which have formed by heating to temperatures sufficient to carbonize and thereby, remove/eliminate heteroatoms. The pores of the porous body of are generally distributed uniformly throughout and have spherical shapes (although not necessarily perfectly spherical). The size of the pores (which may be taken as a diameter or maximum distance across a pore) is generally microscale, e.g., greater than 1 μm, greater than 100 μm, greater than 250 μm. The average size (average over a representative number of pores) may be in a range of from 10 μm to 500 μm.

In the present methods, the porous body is heated in the presence of an added source of gaseous hydrocarbons. The term "added" it meant to indicate that the source of the gaseous hydrocarbons does not originate from the porous body/solid material itself, but rather, is a separate material added in order to carry out the present methods (further described below). Hydrocarbons having relatively few numbers of carbon atoms may be used, e.g., carbon atoms in a range of from 1 to 6, 1 to 4, or 1 to 3. The hydrocarbons may be alkanes, alkenes, or alkynes. The hydrocarbons may be linear in form. The hydrocarbons are generally unsubstituted, i.e., they contain only carbon and hydrogen atoms. Illustrative hydrocarbons include methane, ethane, ethylene, ethyne, propane, propene, propylene. Combinations of different hydrocarbons may be used. In embodiments, the added source of gaseous hydrocarbons consists essentially of, or consists of, any of the hydrocarbons described above alone or in combination, and optionally, one or more inert carrier gases.

The heating of the porous body is carried out according to a temperature and time profile (i.e., a heating profile) selected to generate free radicals from the heteroatoms of the solid material. This is illustrated in FIG. 1B, showing elimination of the various heteroatom-containing functional groups and the resulting generation of free radicals in the carbon matrix. The present methods are based, at least in part, on the inventors' findings that these free radicals can be made to react with certain separately added gaseous hydrocarbons to form unique carbon fiber structures within the porous body, thereby providing a carbon fiber reinforced carbon foam with superior properties.

Figure 2:
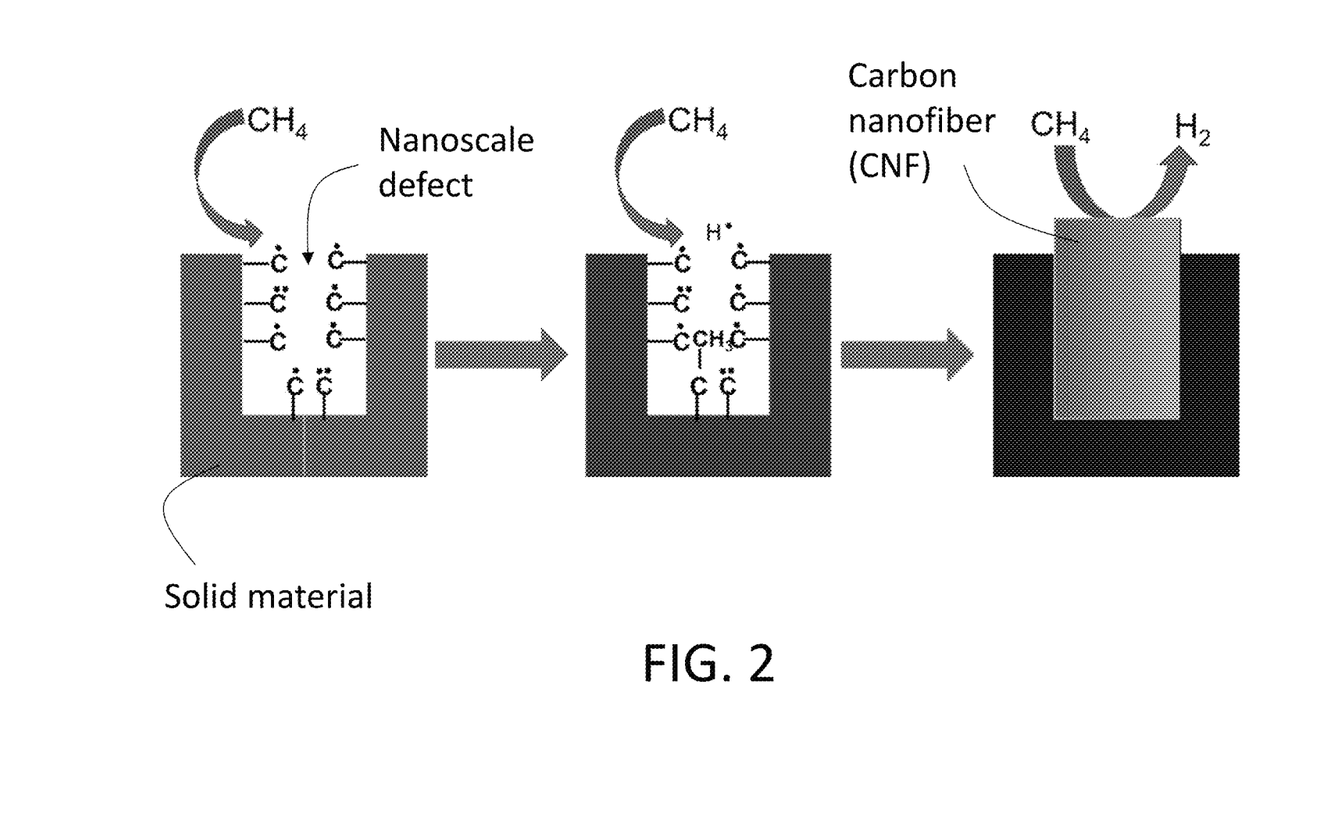
FIG. 2 depicts chemical reactions between free radicals of the matrix of FIG. 1B with an illustrative gaseous hydrocarbon, $CH_4$. The chemical reactions form carbon nanofibers in a nanoscale defect of the solid material of a porous body. The porous body is converted to the carbon fiber reinforced carbon foams according to embodiments of the present methods.
Figure 3A:
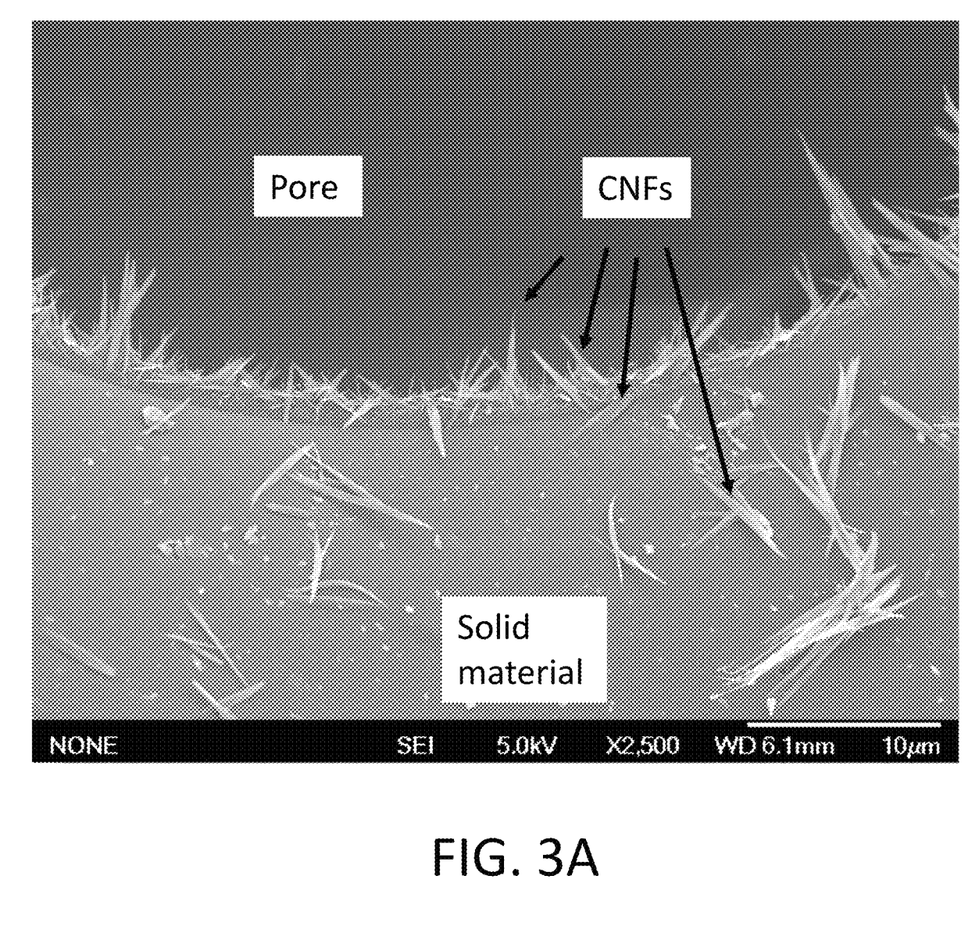
FIG. 3A is a scanning electron microscope (SEM) image of a porous body formed according to an embodiment of the present methods, the surface of which is decorated with a plurality of carbon nanofibers (CNFs).
Figure 3B:
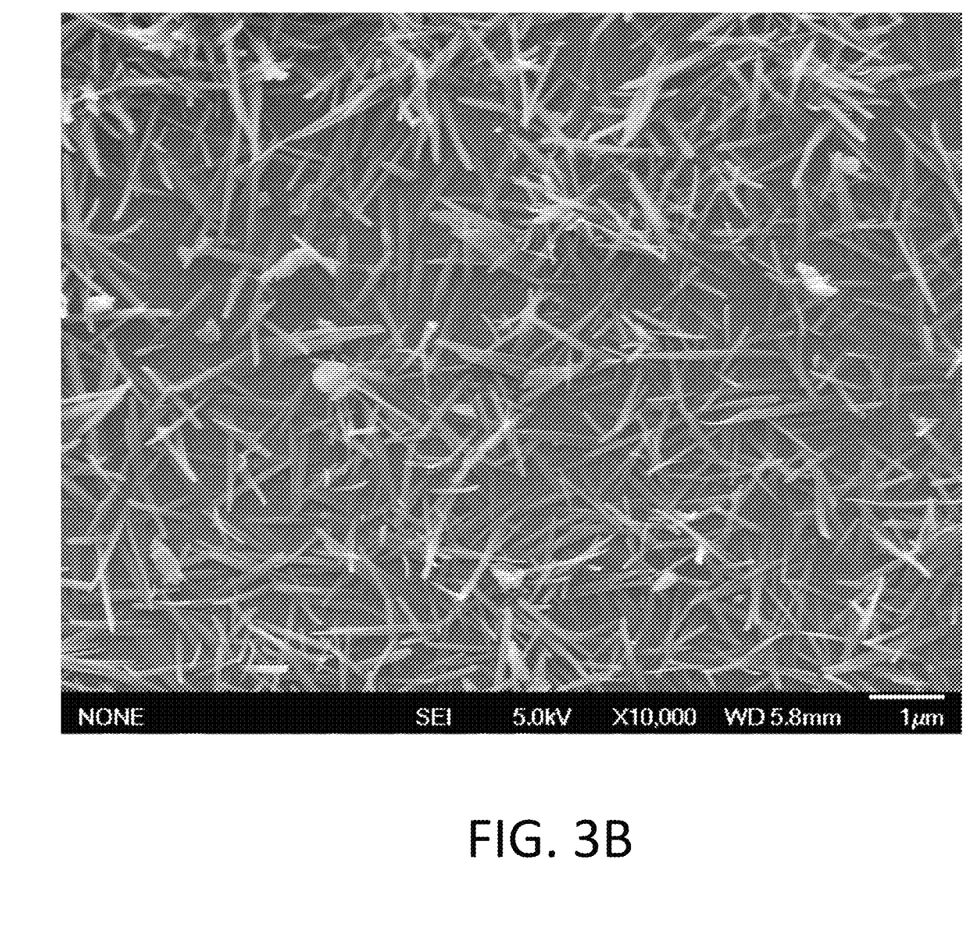
FIG. 3B is another SEM image of the porous body.

The chemical reactions between free radicals and an illustrative gaseous hydrocarbon, $CH_4$, to form carbon nanofibers are illustrated in FIG. 2. Without wishing to be bound to any particular theory, it is believed that the walls of the porous body, although solid, comprise defects in the form of nanoscale (e.g. diameter of less than 1000 nm) cracks, channels, fissures, etc. distributed throughout. It is further believed that certain gaseous hydrocarbons are able to penetrate these nanoscale features and react with free radicals in the solid material, i.e., $—C+CH_4 \rightarrow —C+2H_2$. As shown in the middle and last images, over time, multiple such reactions result in the nucleation and growth of a covalently bound carbon nanofiber that may fill the defect and extend away from the surface of the solid material. FIGS. 3A and 3B are SEM images of a porous body (derived from lignin-based porous body precursor compositions) after heating from room temperature to 950° C. at 3° C./min in the presence of $CH_4$ supplied at an intermediate temperature during the heating. These and other images show that the surface of the solid material is decorated with carbon nanofibers, some which extend along the surface of the underlying solid material, some which extend away from the surface, even perpendicularly. These images also show that the carbon nanofiber nucleation/growth appears to be selective, in that it originates at the defects noted above. The carbon nanofibers generally have a random orientation with respect to one another. The average diameter of the carbon nanofibers (over a representative number of carbon nanofibers) is generally less than 500 nm, including in a range of from 50 nm to 500 nm, or 100 nm to 250 nm. The carbon nanofibers generally have a much longer length, e.g., 1 μm or greater.

Figure 4A:
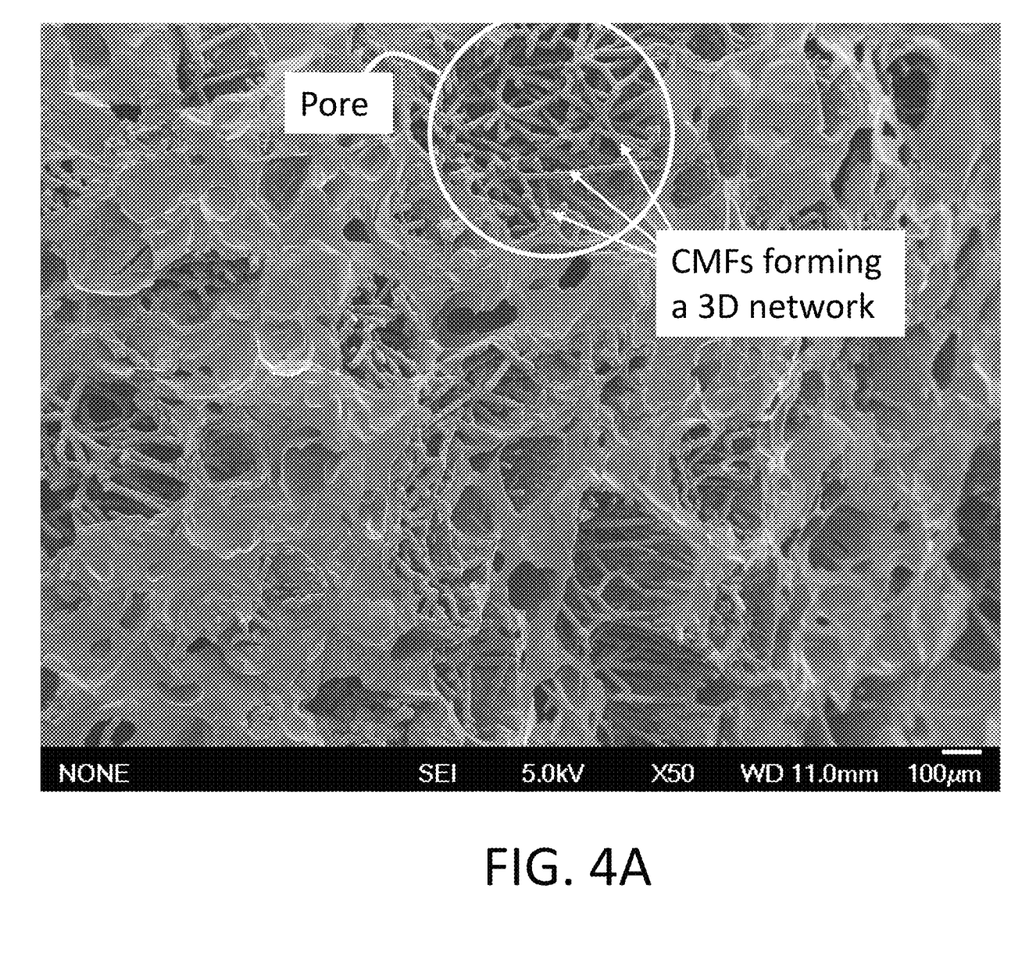
FIGS. 4A and 4B are SEM images showing a porous body formed according to an embodiment of the present methods, showing pores filled with a three-dimensional (3D) network of entangled carbon microfibers (CMFs).
Figure 4B:
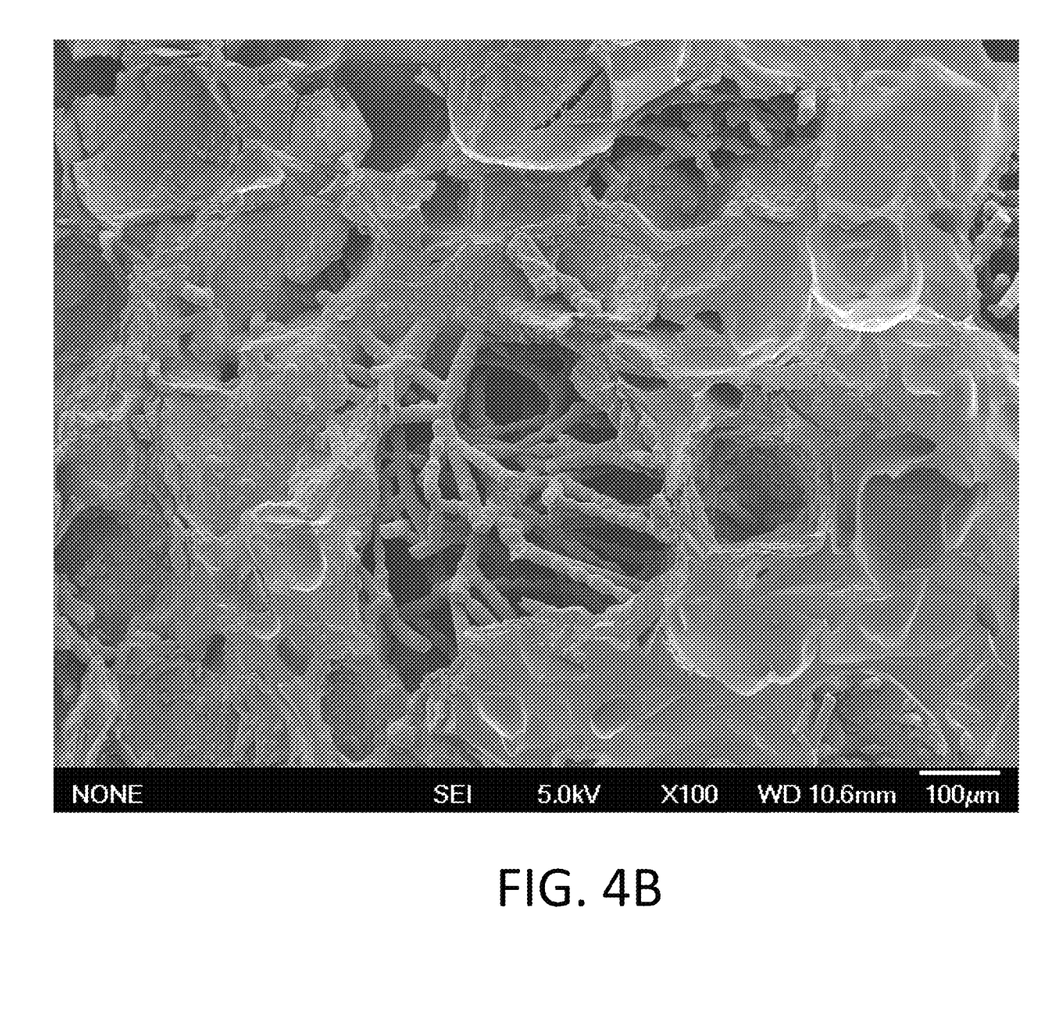

The heating profile is also selected to form a network of carbon microfibers within the pores of the porous body. The network is illustrated in FIGS. 4A and 4B, which show SEM images of a porous body similar to that of FIGS. 3A and 3B after heating to 1100° C. at 1° C./min in the presence of $CH_4$ supplied at an intermediate temperature during the heating. Again, without wishing to be bound to any particular theory, it is believed that at least some of the carbon nanofibers may continue to grow in both length and width, extending into pores of the porous body. Most (or all) of the pores become filled with a network of entangled carbon microfibers that extends in three dimensions (i.e., a 3D network) from a side of each pore to an opposing side. Like the carbon nanofibers, the carbon microfibers generally have a random orientation with respect to one another. The average diameter of the carbon microfibers (over a representative number of carbon microfibers) is generally greater than 10 μm, including in a range of from 10 μm to 100 μm, or 10 μm to 50 μm. The carbon microfibers generally have a much longer length, including lengths which span the diameter of the pore in which they are located.

The heating profile refers to heat applied (i.e., temperature) to the porous body as a function of time. The heating may comprise applying heat to increase the temperature of the porous body from an initial temperature (e.g., room temperature, 20 to 25° C.) to a maximum temperature at a heating rate. The heating profile may involve one or more isothermal holds at certain temperatures and/or use of one or more different heating rates. The maximum temperature is generally less than 1200° C. and may be in the range of from 950 to 1200° C. or 1000 to 1200° C. The heating rate may be in the range of from 0.5 to 20° C./min, 1 to 20° C./min, or 0.5 to 5° C./min, or combinations thereof. The overall heating time depends upon any isothermal holds and heating rate(s), but is generally in a range of 2 to 10 hours, 3 to 8 hours, or 3 to 6 hours.

Figure 5A:
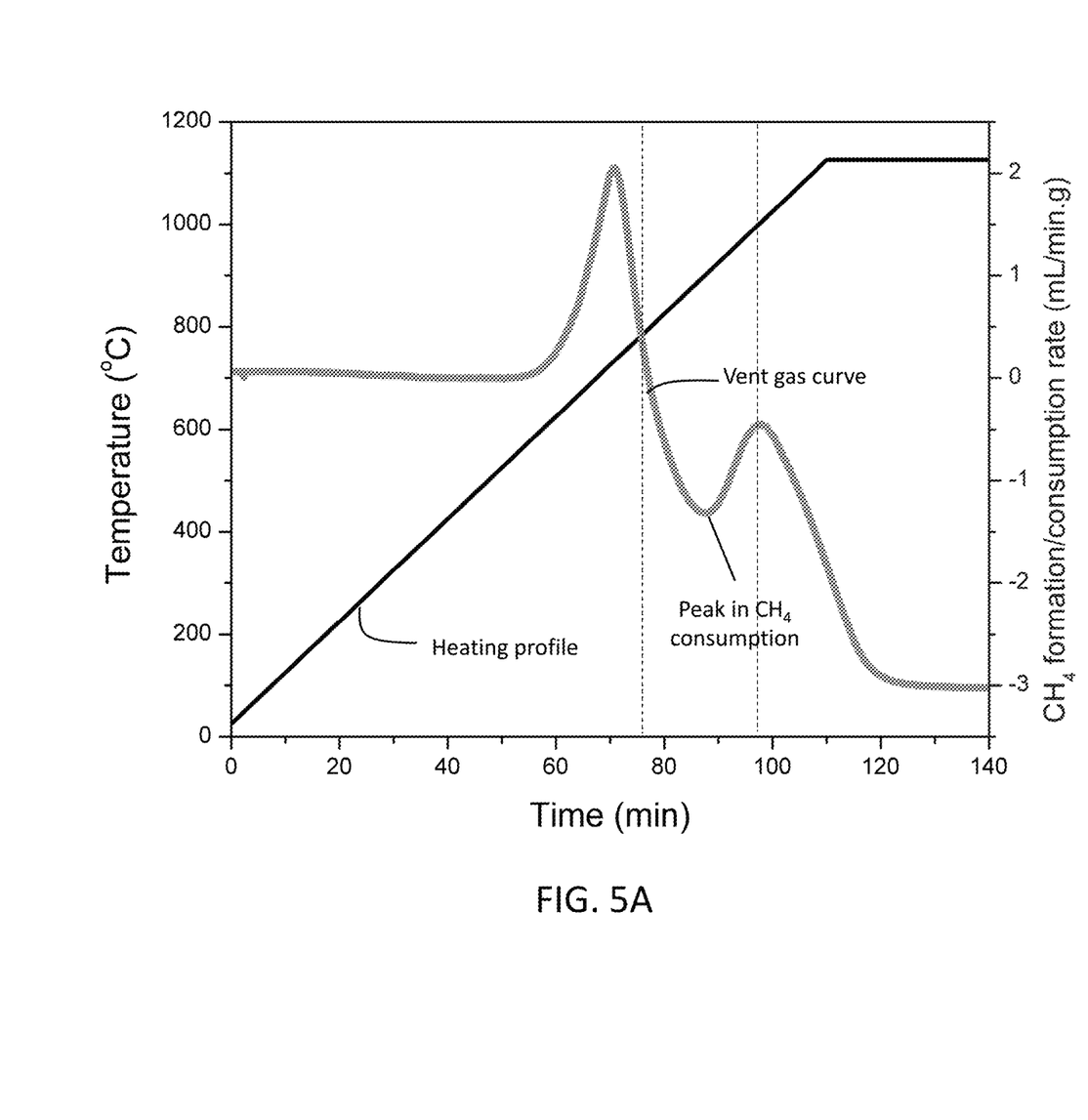
FIG. 5A shows a heating profile according to an embodiment of the present methods and a vent gas curve obtained when heating a porous body according to the heating profile.

Turning back to the added source of gaseous hydrocarbons used in the present methods, the source may be a hydrocarbon gas that is supplied during the heating, i.e., at an intermediate temperature of the heating profile. Any of the hydrocarbons described above may be used. The intermediate temperature may be selected so as to maximize the rate of the free radical-hydrocarbon reactions described above. By way of illustration, FIG. 5A shows an illustrative heating profile (i.e., temperature versus time) which may be used in the present methods. The curve overlaid on the plot shows the real-time quantitative vent gas composition obtained from heating a porous body similar to those used to generate FIGS. 3A-4B in the presence of $CH_4$ supplied at an intermediate temperature during the heating profile. The vertical axis on the right shows the ratio of $CH_4$ formation/consumption (mL/min-g). The curve shows that the amount of $CH_4$ consumption peaks (i.e., $CH_4$ consumption>$CH_4$ formation) between about 700° C. and 950° C.; this range is indicated with the vertical dashed lines. Without wishing to be bound to any particular theory, it is believed this $CH_4$ consumption is due to the free radical-$CH_4$ reactions described above, involving $CH_4$ from the added supply of $CH_4$ gas. FIG. 5A also helps identify the optimal intermediate temperature at which (or range during which) to add the $CH_4$. Specifically, $CH_4$ is desirably added at the temperature which allows $CH_4$ consumption, and therefore, carbon nanofiber formation, to be maximized. As noted above, the present methods are based, in part, on the inventors' realization that adding gaseous hydrocarbon at (or within) the optimal intermediate temperature point (range) ensures carbon nanofiber/microfiber growth. In embodiments, the added source of gaseous hydrocarbons is added at 550° C., 600° C., 650° C., 700° C., 750° C., or in a range of from 550 to 650° C.

At higher temperatures, e.g., beyond 950° C., FIG. 5A shows there is additional $CH_4$ consumption that continues to the end of the heating profile. Again, without wishing to be bound to any particular theory, it is believed that this $CH_4$ consumption involves $CH_4$ cracking and carbon deposition on at least some of the previously formed carbon nanofibers to form the carbon microfibers and the 3D network as described above.

Figure 5B:
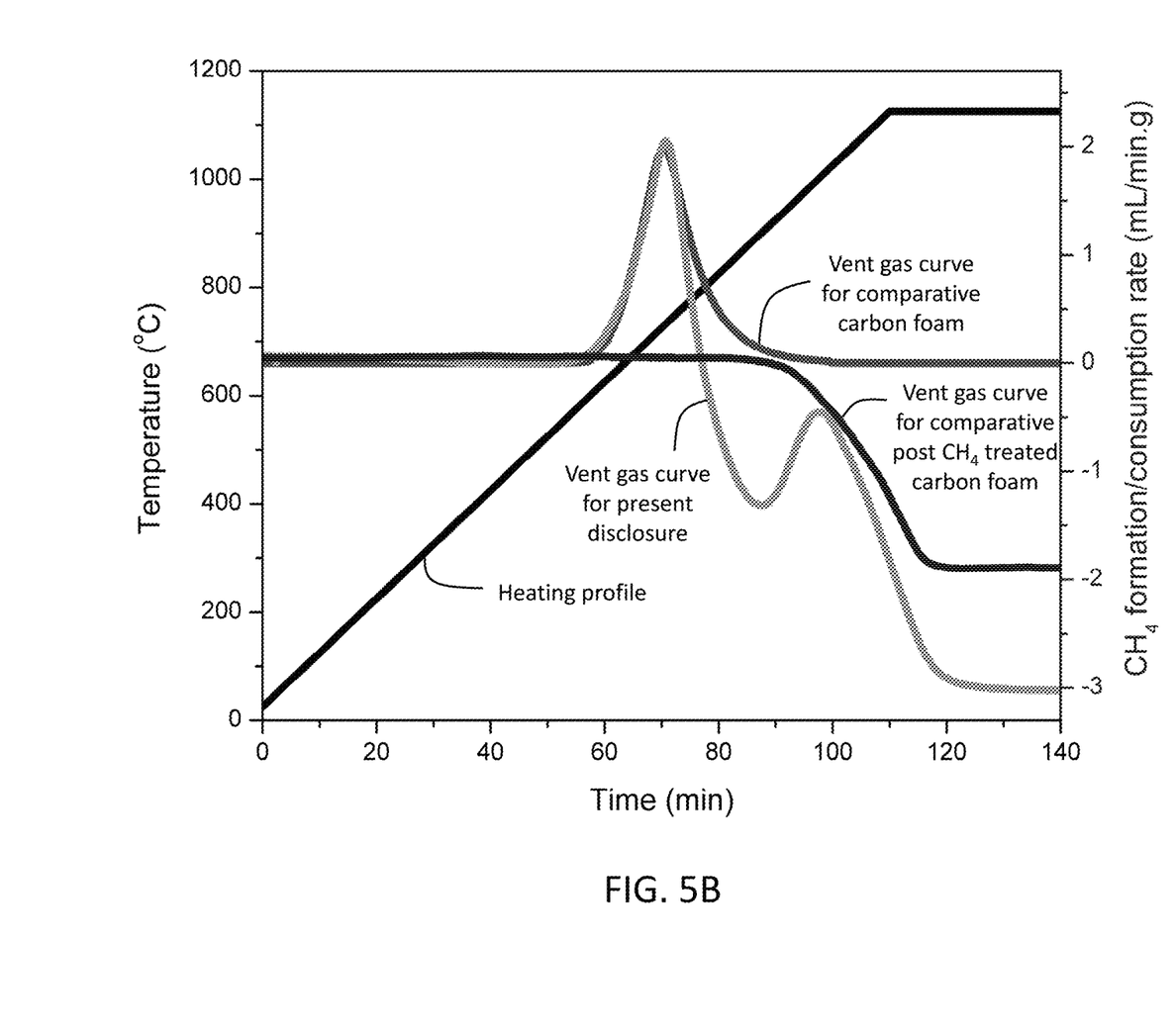
FIG. 5B shows the plot of FIG. 5A with vent gas curves from a comparative carbon foam and a comparative post $CH_4$ CVD treated carbon foam.

FIG. 5B shows significant differences in vent gas composition when carrying out embodiments according to the present methods and those of a comparative carbonization method to produce a carbon foam and a comparative post $CH_4$ CVD process conducted on that carbon foam. The comparative carbonization method is similar to those described in Comparative Examples 1, 4, and 7 in which a porous body is heated according to the heating profile in FIG. 5B to produce a carbon foam (no added source of hydrocarbon is used). The post $CH_4$ CVD process is similar to those described in Comparative Examples 2, 5, and 8 in which the carbon foam is subjected to $CH_4$ CVD. FIG. 5B shows the same heating profile and vent gas curve from FIG. 5A (an illustrative embodiment of the present methods), overlaid with the vent gas curves obtained from the comparative carbonization method and the post-$CH_4$ CVD process. Notably, in the comparative carbonization method, there is no consumption of $CH_4$, no free radical-$CH_4$ reactions, and therefore, no carbon nanofiber/microfiber formation. In the post $CH_4$ CVD process, some $CH_4$ is consumed, but this is via non-selective $CH_4$ cracking and amorphous carbon deposition. There are no free radical-$CH_4$ reactions (as free radicals would have been removed/eliminated during carbonization), and therefore, no carbon nanofiber/microfiber formation.

Figure 6:
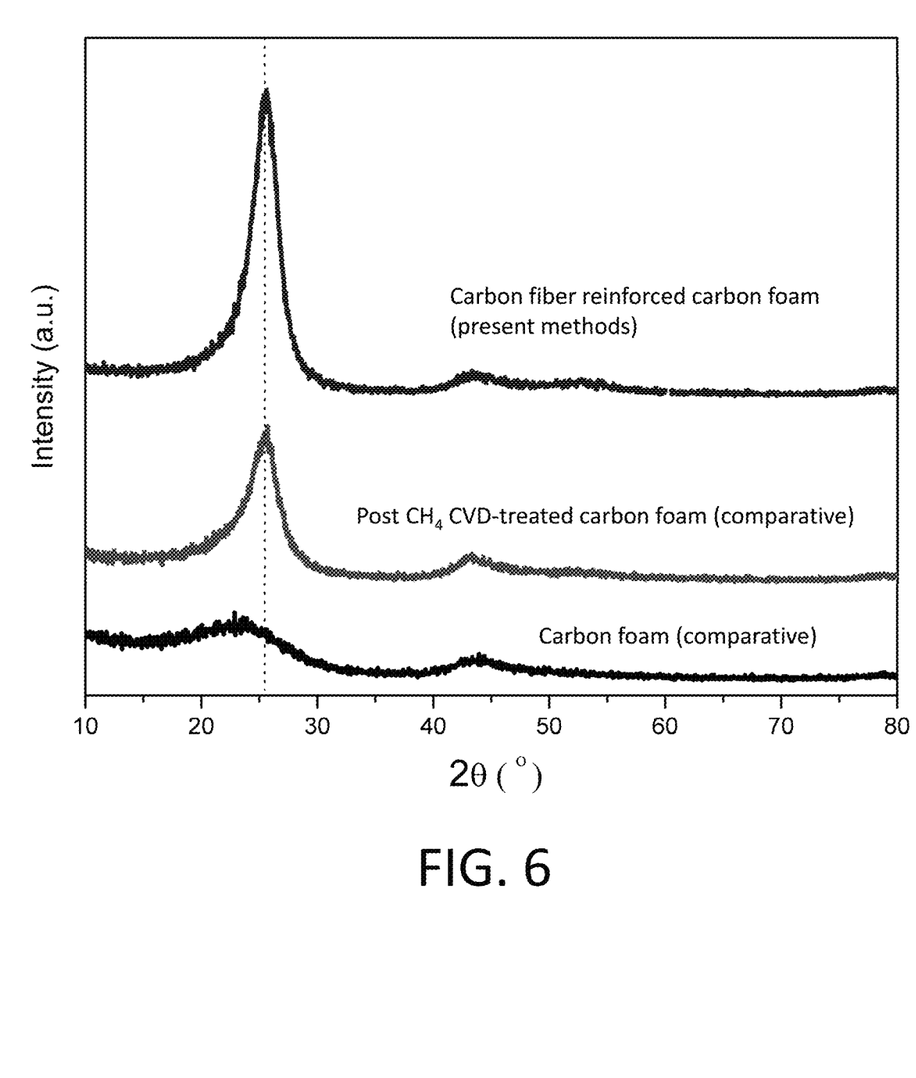
FIG. 6 shows the X-ray diffraction (XRD) spectra of a carbon fiber reinforced carbon foam according to an embodiment of the present methods, a comparative carbon foam, and a comparative post $CH_4$ CVD treated carbon foam.

The fundamentally different structures resulting from embodiments according to the present methods and that of the comparative carbonization method and the comparative post $CH_4$ CVD process are further demonstrated in FIG. 6. This figure shows the XRD spectra of the carbon fiber reinforced carbon foam formed according to embodiments of the present methods (top), the comparative post $CH_4$ CVD treated carbon foam (middle), and the comparative untreated carbon foam (bottom). The peak indicated with the dashed line corresponds to the (002) diffraction peak and provides a measure of the amount of structured, graphite-like carbon in the material. The intensity of the (002) peak of the carbon fiber reinforced carbon foam is over 2 times greater than that of the comparative post $CH_4$ CVD treated carbon foam and 7 times greater than that of the comparative untreated carbon foam. Without wishing to be bound to any particular theory, it is believed that the structured, graphite-like carbon in the carbon fiber reinforced carbon foam originates from the carbon nanofibers described above. The increased amount of graphite-like carbon substantially improves properties of the present carbon fiber reinforced carbon foams, e.g., their compressive strength.

Figure 7:
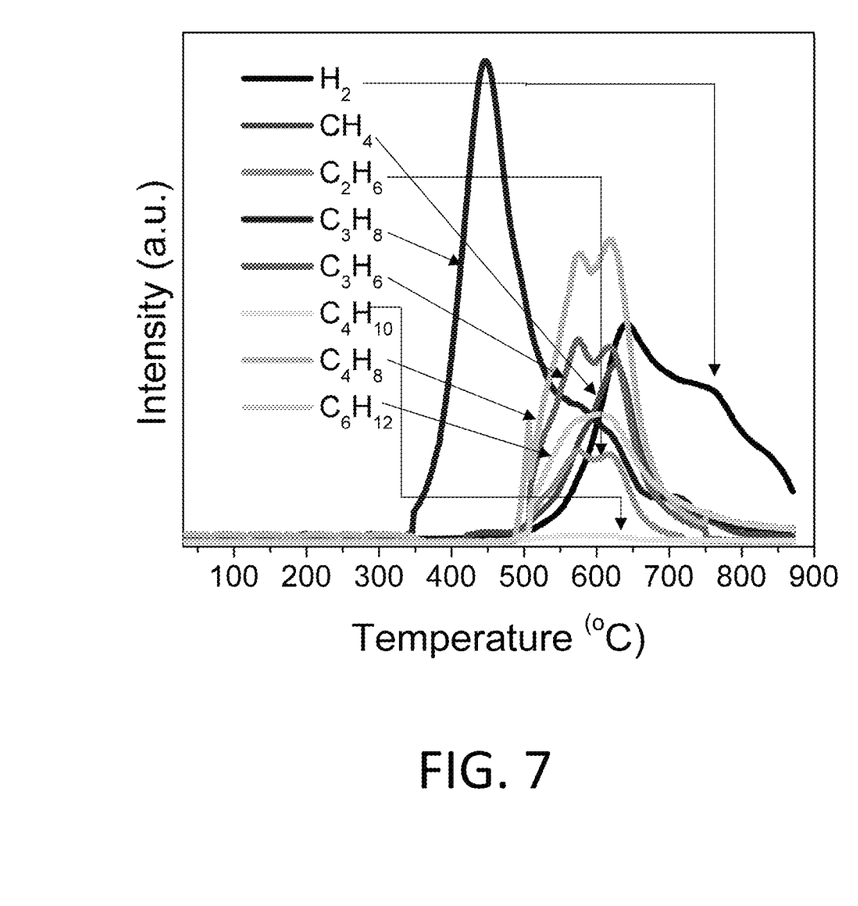
FIG. 7 shows the vent gas curved obtained from heating polypropylene.

As noted above, the added source of gaseous hydrocarbons may be a hydrocarbon gas that is supplied during the heating of the porous body. In other embodiments, the source may be a polymer provided along with the porous body. The polymer may be physically mixed with the porous body precursor composition prior to heating, coloaded with the porous body prior to heating, or infiltrated into the porous body prior to heating. The polymer is generally selected so as to provide the desired gaseous hydrocarbons described above upon heating. The polymer is generally an unsubstituted polyolefin comprising only carbon and hydrogen atoms. Illustrative polymers include polypropylene, polyethylene, polymethylpentene (PMP), and polybutene-1. FIG. 7 shows the real-time quantitative vent gas composition of polypropylene as a function of temperature. This shows that a significant amount of light hydrocarbons such as $CH_4$ are produced between about 500 and 700° C. In embodiments, the added source of gaseous hydrocarbons may be both a gas supplied during the heating of the porous body and a polymer provided along with the porous body.

The carbon fiber reinforced carbon foams formed using the present methods may be described as a solid covalently bound carbon matrix defining pores distributed throughout the matrix, carbon nanofibers covalently bound to a surface of the matrix and extending therefrom, and a network of entangled carbon microfibers within the pores. The presence of the carbon nanofibers/microfibers may be confirmed using various imaging techniques such as SEM. As described above, the present foams are also characterized by the amount of structured, graphite-like carbon therein as measured via the (002) diffraction peak. In embodiments, the foam is characterized by a (002) diffraction peak having an intensity of at least 2 times greater than that of a comparative post $CH_4$ CVD treated carbon foam (see above). This includes having an intensity that is at least 5 times greater than that of a comparative untreated carbon foam (see above).

The present carbon fiber reinforced carbon foams may also be characterized by their apparent density, porosity, compressive strength, thermal conductivity, and electrical resistance. As the Examples, below, demonstrate, the present foams generally have higher apparent density, lower porosity, higher compressive strength, higher thermal conductivity, and lower resistance as compared to both comparative carbon foams and comparative post $CH_4$ CVD treated carbon foams. Regarding compressive strength, the actual value depends upon the particular porous body precursor composition and the source of carbon in that composition. However, the present foams may be characterized by a compressive strength that is at least 20% greater, at least 30% greater, at least 50% greater, at least 75% greater, or at least two times greater than that of a comparative carbon foam. The comparative carbon foam is one prepared according to the same method but without the added source of gaseous hydrocarbon.

After formation according to the present methods, the carbon fiber reinforced carbon foams may be used as is and may be machined and/or incorporated into a desired article of manufacture. An illustrative article is any type of ballistic barrier, e.g., bullet proof clothing such as a hat, vest, etc.; bullet proof window; wall, door, etc.; bullet proof shield. For these and other applications, it may be desirable to infiltrate the present foams with a resin. Illustrative resins include epoxy resins, phenolic resins, polyethylene, polypropylene, polyester or isocyanate resins, graphite resins, silicone resins, nylon, latex, rubber, acrylic resins, polycarbonate resins, resorcinol resins, etc. As illustrated in the Examples below, emulsions/dispersions of such resins may be formed using an organic solvent (e.g., ethanol, isopropanol, tetrahydrofuran (THF), and ethyl acetate, etc.) and used to impregnate/infiltrate into the present foams by applying a vacuum. The present foams (infiltrated or not) may also be coated with or sandwiched between other materials, e.g., carbon sheets.

If desired, the present carbon fiber reinforced carbon foams may be subjected to even higher temperatures, e.g., 1200 to 3000° C. in a non-oxidizing atmosphere to graphitize the foam. However, in embodiments, the present foams are not subjected to such graphitization.

The above description has focused on the conversion of the porous bodies to the carbon fiber reinforced carbon foams. Briefly, illustrative methods for forming the porous bodies themselves are now described. The porous bodies are formed from porous body precursor compositions. These compositions comprise a source of carbon. A variety of carbon sources may be used, e.g., lignin, coal, pitch are illustrative examples. Regarding lignin, this term encompasses lignin which is derived from different biological sources and lignin which is extracted from those different biological sources using different extraction processes. Thus, "lignin" encompasses, e.g., Kraft lignin, sulfate lignin, lignosulfonates, milled wood lignin, organosolv lignin, alkali lignin, soda lignin, hydrolytic lignin, Klason lignin, black liquor, red liquor, and brown liquor. Lignin may be purchased from commercial sources, e.g., Sigma-Aldrich, Inc. Lignin such as organosolv lignin, lignosulfonates, alkali lignin, hydrolytic lignin, and Klason lignin may be purchased from Sigma-Aldrich, Inc. Other lignin, e.g., Kraft lignin, may be obtained from manufacturers such as Domtar. When used as is from any of these sources, these types of lignin may be referred to herein as "raw lignin."

The present porous body precursor compositions may comprise raw lignin as well as an amount of at least partially decomposed lignin. By "at least partially decomposed lignin," it is meant raw lignin (see above) which has been subjected to a heat treatment to at least partially decompose the lignin. The decomposition reactions are distinguished from water desorption/dehydration reactions that may occur in the lignin and generally require higher temperatures. In the decomposition reactions, covalent bonds between various lignin monomeric units may be broken so that the lignin is at least partially depolymerized. (In the desorption/dehydration reactions, the monomeric units generally remain intact.) This heat treatment may involve exposure to a temperature of from 200 to 550° C. for a time of from 10 min to 60 min.

Regarding coal, this term encompasses different types of coal such as bituminous coals, sub-bituminous coal and lignite. Regarding pitch, this term encompasses different types of pitch such as coal tar pitch, petroleum pitch, synthetic pitch, asphaltene pitch, and Mitsubushi AR pitch.

The carbon source in the present porous body precursor compositions may have some water content. Moisture content may be determined using the ASTM D4442-07 standard. The moisture content may be in a range of from 0 wt % to 30 wt % (as compared to the total weight of the water and carbon source). This includes moisture contents in a range of from 2 wt % to 30 wt % or from 5 wt % to 15 wt %.

The present porous body precursor compositions may further comprise an additive. Illustrative additives include inorganic oxides such as silica gel, alumina, zinc oxide, tungsten oxide, etc. However, at least in embodiments, other additives are not included: compounds capable of reacting with lignin to covalently bind the lignin to another component of the composition (e.g., isocyanates, silanes); compounds capable of inducing such reactions (e.g., catalysts); foaming/blowing agents (surfactants, separately added gases such as $CO_2$, baking powder, axodicarbonamide, titanium hydride, isocyanates, wood flour, wood fiber); and processing aids such as plasticizers (e.g., glycol, glycerol, crude glycerol, epoxidized soybean oil, poly(ethylene glycol), poly(propylene glycol)) and lubricants (e.g., stearic acid, sodium stearate, calcium stearate, mineral oil). The porous body precursor compositions may be free of each of these additives, i.e., they are not added to the composition before or during the methods disclosed herein.

Various amounts of the various components described above may be included in the present porous body precursor compositions, the source of carbon may be present at an amount of at least 80 wt %, at least 85 wt %, at least 90 wt %, at least 95 wt %, at least 98 wt %, or 100 wt %. An additive, when included, may be present in an amount of from 1 wt % to 15 wt %. If lignin is the carbon source, the lignin content may be exclusively raw lignin. However, in embodiments, the lignin content may be from 3 wt % to 20 wt % of at least partially decomposed lignin, with the balance as raw lignin. If an added source of gaseous hydrocarbons is to be provided along with the porous body by physically mixing with components of the porous body precursor composition, the added source may be from 0.5 wt % to 10 wt %, 1 wt % to 8 wt %, 2 wt % to 6 wt %. In embodiments, the porous body precursor composition consists essentially of, or consists of, the carbon source (including any water, if present), optionally, an added source of gaseous hydrocarbons, and optionally, an inorganic oxide. In embodiments, the porous body precursor composition consists essentially of, or consists of, the carbon source (including any water, if present), and optionally, an inorganic oxide.

The present porous body precursor compositions may be made by mixing a desired amount of the desired components for a period of time, e.g., from 5 to 60 minutes. The mixing may be conducted in a blender or ball mill or the like. The resulting porous body precursor compositions are in the form of a solid powder (however, the moisture content of the powder may be within the ranges described above).

To convert the present porous body precursor compositions into the porous bodies, the compositions are heated to according to another temperature and time profile. In this case, the heating is carried out to generate pores. This may include vaporizing any water present in the porous body precursor compositions to generate steam and thus, pores. The heating may comprise applying heat to increase the temperature of the porous body precursor composition from an initial temperature (e.g., room temperature) to a maximum temperature at a heating rate. There may be one or more isothermal holds at certain temperatures and/or use of one or more different heating rates. The maximum temperature is generally 600° C. or less, including 550° C. or less, 500° C. or less, 450° C. or less, and in a range of from 250 to 600° C. The heating rate may be in the range of from 0.1 to 30° C./min. The overall heating time depends upon any isothermal holds and heating rate, but is generally in a range of 30 minutes to 2 hours. The heating may be carried out under a vacuum or under inert conditions (e.g., by providing an inert gas). Pressure (e.g., mechanical pressure) may be applied during heating, but this is not necessary. Prior to heating, a mechanical pressure may be applied to the porous body precursor composition. After heating to form the porous body, the porous body may be cooled to room temperature prior to the second heating step described above. However, in embodiments, the porous body may be continued to be heated according to the second heating step to form the final carbon reinforced carbon foam.

In other embodiments, synthetic foams may be used as the porous bodies such as commercially available synthetic foams.

EXAMPLES

The morphology and microstructure of the carbon foam samples were investigated by electron microscope. Both the apparent (Da) and true densities (Dt) of carbon foam samples were measured following standard methods ASTM D 1622 and ASTM D 792-08. The bulk porosity of the carbon foam samples was calculated using the following equation: P (%)=100×((Dt−Da)/(Dt). where P is bulk porosity; Dt is true density; Da is apparent density. Experiments were conducted according to ASTM standards to determine the mechanical properties the carbon foam samples. The compression strength was tested according to ASTM Standard C365/C365M-05. The tests were carried out at room temperature on an electron universal testing machine. Thermal conductivity was measured following ASTM Standard E1225 by a laserflash thermal analyzer at room temperature. The electrical resistance of the carbon foam samples was tested following the standard method of ASTM D 4496.

Comparative Example 1

400 grams of dried kraft lignin (moisture 2.5%) and 200 grams of 500° C. pre-decomposed kraft lignin were put into a ball mill machine and ground for 30 minutes. The precursor mixture was transferred to a mold; the mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 10° C./min up to a temperature of about 1000-1200° C. under vacuum or a non-oxidizing atmosphere and held at this temperature to achieve carbonization. Carbon foams were then cooled to room temperature at a rate of less than about 10° C./min.

Comparative Example 2

The carbon foam prepared in Comparative Example 1 was put into the high temperature furnace, which was heated at a rate of from about 1 to 20° C./min up to 800° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

Example 3

400 grams of dried kraft lignin (moisture 2.5%) and 200 grams of 500° C. pre-decomposed kraft lignin were put into a ball mill machine and ground for 30 minutes. The precursor mixture was transferred to a mold; the mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 20° C./min up to 600° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

TABLE 1

Physical properties of carbon foams prepared according to Examples 1-3.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 1 | 0.32 ± 0.2 | 87.6 ± 2.5 | 15.5 ± 1.3 | 0.33 ± 0.03 | 0.05-0.08 |
| 2 | 0.34 ± 0.3 | 84.3 ± 3.2 | 22.3 ± 2.5 | 0.41 ± 0.05 | 0.03-0.05 |
| 3 | 0.35 ± 0.2 | 80.9 ± 2.3 | 29.1 ± 1.8 | 0.48 ± 0.05 | 0.01-0.03 |

Comparative Example 4

360 grams of dried kraft lignin (moisture 2.5%), 180 grams 550° C. pre-decomposed kraft lignin, and 60 grams of $ZrO_2$ oxide powder were put into a ball mill machine and ground for 30 minutes. The composition was deposited in a mold and was cold pressed using a pressure of between 0 and 50 MPa for a time of between 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace for further carbonization, which was heated at a rate of from about 1 to 10° C./min up to a temperature of about 1000-1200° C. under vacuum or a non-oxidizing atmosphere and held at this temperature to achieve carbonization. The carbon-$ZrO_2$ composite was then cooled to room temperature at a rate of less than about 10° C./min.

Comparative Example 5

The carbon-$ZrO_2$ composite prepared in Comparative Example 4 was put into the high temperature furnace, which was heated at a rate of from about 1 to 20° C./min up to 800° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

Example 6

360 grams of dried kraft lignin (moisture 2.5%), 180 grams 550° C. pre-decomposed kraft lignin and 60 grams of $ZrO_2$ oxide powder were put into a ball mill machine and ground for 30 minutes. The composition was deposited in a mold and was cold pressed using a pressure of between 0 and 50 MPa for a time of between 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 20° C./min up to 600° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hours.

TABLE 2

Physical properties of carbon foams prepared according to Examples 4-6

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 4 | 0.62 ± 0.3 | 68.3 ± 3.6 | 45.6 ± 3.7 | 0.28 ± 0.08 | 0.07-0.11 |
| 5 | 0.65 ± 0.2 | 63.4 ± 2.8 | 50.9 ± 3.0 | 0.33 ± 0.06 | 0.05-0.08 |
| 6 | 0.68 ± 0.3 | 59.7 ± 3.3 | 57.5 ± 2.6 | 0.38 ± 0.03 | 0.03-0.06 |

Comparative Example 7

540 grams 200° C. pre-decomposed kraft lignin and 60 grams of WO$_3$ powder (<200 nm) were put into a ball mill machine and ground for 30 minutes. The composition was deposited in a mold and was cold pressed using a pressure of between 0 and 50 MPa for a time of between 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace for further carbonization, which was heated at a rate of from about 1 to 10° C./min up to a temperature of 1200° C. under vacuum or a non-oxidizing atmosphere and held at this temperature to achieve carbonization. The carbon-tungsten carbide composite was then cooled to room temperature at a rate of less than about 10° C./min.

Comparative Example 8

The carbon-tungsten carbide composite prepared in Comparative Example 7 was put into the high temperature furnace, which was heated at a rate of from about 1 to 20° C./min up to 800° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hours.

Example 9

540 grams 200° C. pre-decomposed kraft lignin and 60 grams of WO$_3$ powder (<200 nm) were put into a ball mill machine and ground for 30 minutes. The composition was deposited in a mold and was cold pressed using a pressure of between 0 and 50 MPa for a time of between 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 20° C./min up to 600° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hour.

TABLE 3

Physical properties of carbon foams prepared according to Examples 7-9.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 7 | 0.81 ± 0.4 | 69.9 ± 3.2 | 48.3 ± 4.3 | 0.75 ± 0.05 | 0.03-0.05 |
| 8 | 0.83 ± 0.3 | 65.8 ± 2.9 | 53.8 ± 3.6 | 0.79 ± 0.05 | 0.02-0.04 |
| 9 | 0.85 ± 0.3 | 63.2 ± 2.5 | 59.7 ± 2.9 | 0.83 ± 0.07 | 0.01-0.03 |

Example 10

In this example, 540 grams of Kraft lignin (raw lignin, 2.5% moisture) and 60 grams of polypropylene powder (<200 microns) were put into a blender and mixed very well for 30 minutes. The composition was then transferred into the ceramic molding chamber. The composition was cold pressed under a pressure of between 0 and 10 MPa. Next, the compositions in the mold were transferred to a high temperature vacuum furnace, which was heated at a rate of from about 1 to 20° C./min up to 1200° C. under a non-oxidizing atmosphere, and kept at this temperature for 1-5 hours.

Example 11

400 grams of dried kraft lignin (moisture 2.5%) and 200 grams of 500° C. pre-decomposed kraft lignin were put into a ball mill machine and ground for 30 minutes. The precursor mixture was transferred to a mold; the mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace. 50 grams of polypropylene resin was co-loaded with the foam into the furnace, which was heated at a rate of from about 1 to 20° C./min up to a temperature of about 1000-1200° C. under or a non-oxidizing atmosphere and held at this temperature. The carbon foam was then cooled to room temperature at a rate of less than about 10° C./min.

Example 12

400 grams of dried kraft lignin (moisture 2.5%) and 200 grams of 500° C. pre-decomposed kraft lignin were put into a ball mill machine and ground for 30 minutes. The precursor mixture was transferred to a mold; the mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, a polypropylene solution was obtained by dissolving polypropylene resin in xylene. The porous body prepared in the previous step was impregnated with the polypropylene solution for 30 min, removed from the solution, and dried in a hood to remove the excess residue from the pore structure. This impregnating process was repeated three times. The polypropylene impregnated porous body was dried at 60° C. for 1 day to evaporate the solvent. The impregnated porous body was heated to 1000-1200° C. at a heating rate of 0.5-5° C./min in argon atmosphere and kept at the temperature for 1-5 hours. The carbon foam was then cooled to room temperature at a rate of less than about 10° C./min.

TABLE 4

Physical properties of carbon foams prepared according to Examples 10- 12.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 10 | 0.28 ± 0.2 | 90.3 ± 1.5 | 19.1 ± 1.6 | 0.35 ± 0.04 | 0.04-0.07 |
| 11 | 0.30 ± 0.3 | 88.7 ± 1.3 | 22.6 ± 2.3 | 0.40 ± 0.05 | 0.03-0.05 |
| 12 | 0.32 ± 0.2 | 85.1 ± 1.7 | 27.8 ± 1.3 | 0.43 ± 0.03 | 0.02-0.04 |

Comparative Example 13

In this example, a commercial petroleum mesophase pitch was utilized as the carbon source for the porous body precursor composition. The mesophase pitch was first loaded to a proper vessel. The vessel was then evacuated to less than 1 Torr and then heated to a temperature approximately 50 to 100° C. above the softening point. At this point, the vacuum was released to a nitrogen blanket, and then a pressure of up to 1000 psi was applied. The temperature of the system was then raised to about 400-500° C. at a heating rate of 0.5-5° C./min and held for 0.5-1 hour, and then the furnace power was turned off and cooled to room temperature at a rate of 0.5-2° C./min. The pressure in the vessel was released at a rate of 1-10 psi/min. The pitch porous body was transferred to a high temperature vacuum furnace, which was heated at a rate of from about 1 to 10° C./min up to a temperature of about 1000-1200° C. under vacuum or a non-oxidizing atmosphere and held at this temperature for 0.5-3 hours. The carbon foam was then cooled to room temperature at a rate of less than about 10° C./min.

Comparative Example 14

The pitch carbon foam prepared in Comparative Example 13 was put into the high temperature furnace, which was heated at a rate of from about 1 to 10° C./min up to 800° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hours.

Example 15

The pitch porous body was prepared as described in Comparative Example 13. Derived foam was removed from the high pressure vessel and transferred to a high temperature vacuum furnace, which was heated at a rate of from about 1 to 10° C./min up to 600° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hours.

TABLE 5

Physical properties of carbon foams prepared according to Examples 13-15.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 13 | 0.30 ± 0.3 | 88.7 ± 1.5 | 12.0 ± 1.1 | 0.25 ± 0.03 | 0.05-0.08 |
| 14 | 0.32 ± 0.3 | 84.9 ± 1.3 | 15.4 ± 1.5 | 0.28 ± 0.04 | 0.04-0.06 |
| 15 | 0.35 ± 0.2 | 81.5 ± 1.7 | 19.7 ± 1.9 | 0.35 ± 0.06 | 0.02-0.04 |

Comparative Example 16

Comminuted bituminous coal was ground to a particle size of about 60-80 mesh then deposited in a mold. The mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 10° C./min up to a temperature of about 1000-1200° C. under vacuum or a non-oxidizing atmosphere and held at this temperature. The carbon foam was then cooled to room temperature at a rate of less than about 10° C./min.

Comparative Example 17

The carbon foam prepared in Comparative Example 16 was put into the high temperature furnace, which was heated at a rate of from about 1 to 20° C./min up to 800° C. under vacuum or a non-oxidizing atmosphere, then switched to an Ar—CH$_4$ gas flow, and the furnace was continued to be heated at a rate of from about 0.5 to 5° C./min up to 1200° C. and kept at this temperature for 1-5 hours.

Example 18

Comminuted bituminous coal was ground to a particle size of about 60-80 mesh then deposited in a mold. The mold was then compressed over a hydraulic press machine, and a pressure between 0 and 50 MPa was applied to the composition for 5-60 seconds. The compositions were then transferred to a muffle furnace. Nitrogen or argon gas was first introduced into the muffle furnace to purge the air. The furnace was then heated at a heating rate of from about 0.1 to 10° C./min up to a temperature of about 450-600° C. and held for 30 to 60 minutes. The compositions were then cooled to room temperature at a rate of less than about 10° C./min. Next, the compositions were removed from the furnace and transferred to a high temperature vacuum furnace, which was heated at a rate of from about 1 to 20° C./min up to 600° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

TABLE 6

Physical properties of carbon foams prepared according to Examples 16-18.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 16 | 0.45 ± 0.5 | 77.1 ± 3.5 | 15.7 ± 1.8 | 0.27 ± 0.03 | 0.06-0.09 |
| 17 | 0.48 ± 0.3 | 73.0 ± 2.7 | 20.8 ± 2.2 | 0.30 ± 0.05 | 0.04-0.06 |
| 18 | 0.51 ± 0.3 | 70.3 ± 1.8 | 25.0 ± 1.9 | 0.35 ± 0.05 | 0.02-0.05 |

Example 19

A commercial PU foam with 50 PPI (pores per inch) was used as a porous body and was impregnated with a phenol-formaldehyde (PF) resin to provide a source of gaseous hydrocarbons. The PF solution was obtained by a reaction of phenol and formaldehyde with sodium hydroxide as a catalyst. Phenol, sodium hydroxide, and distilled water were placed in a reaction flask. Formaldehyde was then added dropwise, and then the reaction was carried out at room temperature for 3 days. PU foams were impregnated with the PF solution for 30 min, removed from the solution, and dried using an air gun to remove the excess residue resin from the pore structure. This impregnating process was repeated three times. The impregnated porous body was dried at 60° C. for 1 day to evaporate the solvent. The impregnated porous body was heated to 1000-1200° C. at a heating rate of 0.5-5° C./min in argon and kept at the temperature for 1-3 hours.

Example 20

The carbon foam from Example 19 was put into the high temperature furnace, which was heated at a rate of from about 1 to 10° C./min up to 800° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

Example 21

The impregnated porous body from Example 19 was transferred to a high temperature vacuum furnace, which was heated at a rate of from about 1 to 20° C./min up to 600° C. under vacuum or a non-oxidizing atmosphere, then switched to an Ar—$CH_4$ gas flow, and the furnace was continued to be heated at a rate of from about 0.5 to 5° C./min up to 1200° C. and kept at this temperature for 1-5 hours.

TABLE 7

Physical properties of carbon foams prepared according to Examples 19-21.

| Example | Apparent density (g/cm$^3$) | Porosity (%) | Compressive strength (MPa) | Thermal conductivity (W/m-K) | Electrical Resistance (ohm-cm) |
|---|---|---|---|---|---|
| 19 | 0.52 ± 0.3 | 69.7 ± 1.8 | 19.3 ± 1.5 | 0.55 ± 0.03 | 0.05-0.07 |
| 20 | 0.54 ± 0.3 | 66.5 ± 1.6 | 21.8 ± 1.7 | 0.59 ± 0.05 | 0.03-0.05 |
| 21 | 0.57 ± 0.2 | 63.7 ± 2.3 | 25.6 ± 1.3 | 0.65 ± 0.03 | 0.02-0.05 |

Example 22

One-inch thick carbon fiber reinforced carbon foam was used, prepared as described in Example 3 (about 0.33 g/cc to about 0.35 g/cc). Commercial No. 635 epoxy resin (containing 70-90% 4,4'-isopropylidenediphenol-epichlorohydrin copolymer by weight), with a ratio of 3:1 for resin and hardener, was obtained from US Composites Inc. (West Palm Beach, Fla., US) for infiltration. The resin was first diluted in an organic solvent. The diluted resin solution contained from 20 to 80% solids content. The hardener was added to the diluted resin with a mass ratio of 3:1 (resin to hardener). The resulting mixture was further mixed via mechanical mixer at a speed of 500 rpm for 5 min. A single-step impregnation procedure was employed. The carbon fiber reinforced carbon foam was first placed in an impregnation tray, and the resin mixture was infiltrated at room temperature under vacuum. The carbon foams can be infiltrated once or multiple times to control the amount of resin that is infiltrated. Next, the infiltrated carbon fiber reinforced carbon foam was placed in the vacuum oven at 50° C. for 6 h or left in a hood at room temperature until the solvent volatilized and the resin was cured.

Example 23

The infiltrated carbon fiber reinforced carbon foam of Example 22 was laminated between two carbon fiber sheets. A sandwich structure comprising the infiltrated carbon fiber reinforced carbon foam between two carbon fiber sheets was assembled and placed in a vacuum bag. Air was removed from the bag by suction to provide a curing pressure. The vacuum was held until curing of the carbon fiber sheets to the carbon foam was complete. The laminated/infiltrated carbon fiber reinforced carbon foam was then removed, trimmed, and machined as required.

The laminated carbon foam composites were prepared and tested as a ballistic protection plate. The ballistic tolerance of a sample (one-inch thickness) of Example 23 was evaluated against 30 caliber bullet using a standard protocol. The results showed that the sample absorbed most of the kinetic energy of the bullet effectively and stopped the bullet in within the body of the sample. The bullet did not exit the sample.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of forming a carbon fiber reinforced carbon foam, the method comprising:
heating a porous body composed of a solid material comprising covalently bound carbon atoms and heteroatoms and having a surface defining pores distributed throughout the solid material, in the presence of an added source of gaseous hydrocarbons, wherein the heating generates free radicals in the porous body from the heteroatoms and induces reactions between the free radicals and the gaseous hydrocarbons to form covalently bound carbon nanofibers extending from the surface of the solid material and a network of entangled carbon microfibers within the pores the porous body, thereby forming a carbon fiber reinforced carbon foam.

2. The method of claim 1, wherein the gaseous hydrocarbons comprise hydrocarbons having from 1 to 6 carbon atoms.

3. The method of claim 2, wherein the gaseous hydrocarbons are selected from methane, ethane, ethylene, ethyne, propane, propene, propylene, and combinations thereof.

4. The method of claim 1, wherein the covalently bound carbon nanofibers at least partially fill, and extend from nanoscale defects in the solid material.

5. The method of claim 1, wherein the network of entangled carbon microfibers fills the pores.

6. The method of claim 1, wherein the heating is applied to increase the porous body's temperature from an initial temperature to a maximum temperature at a heating rate.

7. The method of claim 6, wherein the maximum temperature is in a range of from 950° C. to 1200° C. and the heating rate is in a range of from 0.5° C./min to 20° C./min.

8. The method of claim 1, wherein the added source of gaseous hydrocarbons is a hydrocarbon gas supplied during the heating.

9. The method of claim 8, wherein the hydrocarbon gas is supplied at a temperature in a range of from 550° C. to 650° C.

10. The method of claim 9, wherein the hydrocarbon gas is supplied at 600° C.

11. The method of claim 1, wherein the heating is applied to increase the porous body's temperature from an initial temperature to a maximum temperature at a heating rate and the maximum temperature is in a range of from 950° C. to 1200° C. and the heating rate is in a range of from 0.5° C./min to 20° C./min, and further wherein the added source of gaseous hydrocarbons is a hydrocarbon gas supplied during the heating.

12. The method of claim 1, wherein the carbon fiber reinforced carbon foam is characterized by a (002) diffraction peak as determined by X-ray diffraction having an intensity of at least 2 times greater than that of a comparative post $CH_4$ CVD treated carbon foam.

13. The method of claim 1, wherein the added source of gaseous hydrocarbons is a polymer provided with the porous body.

14. The method of claim 13, wherein the polymer is polypropylene, polyethylene, or combinations thereof.

15. The method of claim 13, wherein the added source of gaseous hydrocarbons is both the polymer and a hydrocarbon gas supplied during the heating.

16. The method of claim 1, wherein the porous body has been formed from a porous body precursor composition comprising a carbon source selected from lignin, pitch, coal, or combinations thereof.

17. The method of claim 16, further comprising forming the porous body from the porous body precursor composition.

18. The method of claim 1, wherein the porous body has been formed from a porous body precursor composition consisting essentially of a carbon source, optionally, the added source of gaseous hydrocarbons, and optionally, an inorganic oxide.

* * * * *